United States Patent [19]

Mizutani et al.

[11] Patent Number: 4,741,496

[45] Date of Patent: May 3, 1988

[54] TAPE CARTRIDGE

[75] Inventors: Hikaru Mizutani, Minoh; Hiroyoshi Takagi, Kameoka; Toshiyuki Amaike; Harutaka Hayashi, both of Otokuni, all of Japan

[73] Assignee: Hitachi Maxell, Ltd., Osaka, Japan

[21] Appl. No.: 908,383

[22] Filed: Sep. 17, 1986

[30] Foreign Application Priority Data

Sep. 18, 1985 [JP] Japan ................... 60-207444

[51] Int. Cl.$^4$ .................. G11B 15/43; G11B 1/04
[52] U.S. Cl. .................. 242/199; 226/195
[58] Field of Search ........ 242/199, 200, 192, 194–195, 242/197–198; 226/195–199, 189; 360/130.2, 132, 137

[56] References Cited

U.S. PATENT DOCUMENTS

| | | | |
|---|---|---|---|
| 4,463,918 | 8/1984 | Takagi | 242/199 |
| 4,518,135 | 3/1985 | Gebeke | 242/199 |
| 4,569,492 | 2/1986 | Gelardi et al. | 242/199 |
| 4,575,023 | 3/1986 | Komiyama et al. | 242/199 |
| 4,595,962 | 6/1986 | Costemore d'Arc | 242/199 |
| 4,598,329 | 7/1986 | Nelson | 242/199 X |

*Primary Examiner*—Donald Watkins
*Attorney, Agent, or Firm*—Birch, Stewart, Kolasch & Birch

[57] ABSTRACT

There is provided a tape cartridge comprising a tape receiving member formed near a tape running path in the tape cartridge for receiving a tape, and a tape pushing member arranged to face the tape receiving member through the tape, the tape pushing member being arranged to move between a tape pinching position in which the tape is pinched between the tape receiving member and the tape pushing member, and a cancellation position in which the tape pushing member moves away from the tape. Accordingly, when the tape pushing member is positioned at the tape pinching position, the tape cartridge can prevent the tape from protruding from the front surface of the tape cartridge.

17 Claims, 4 Drawing Sheets

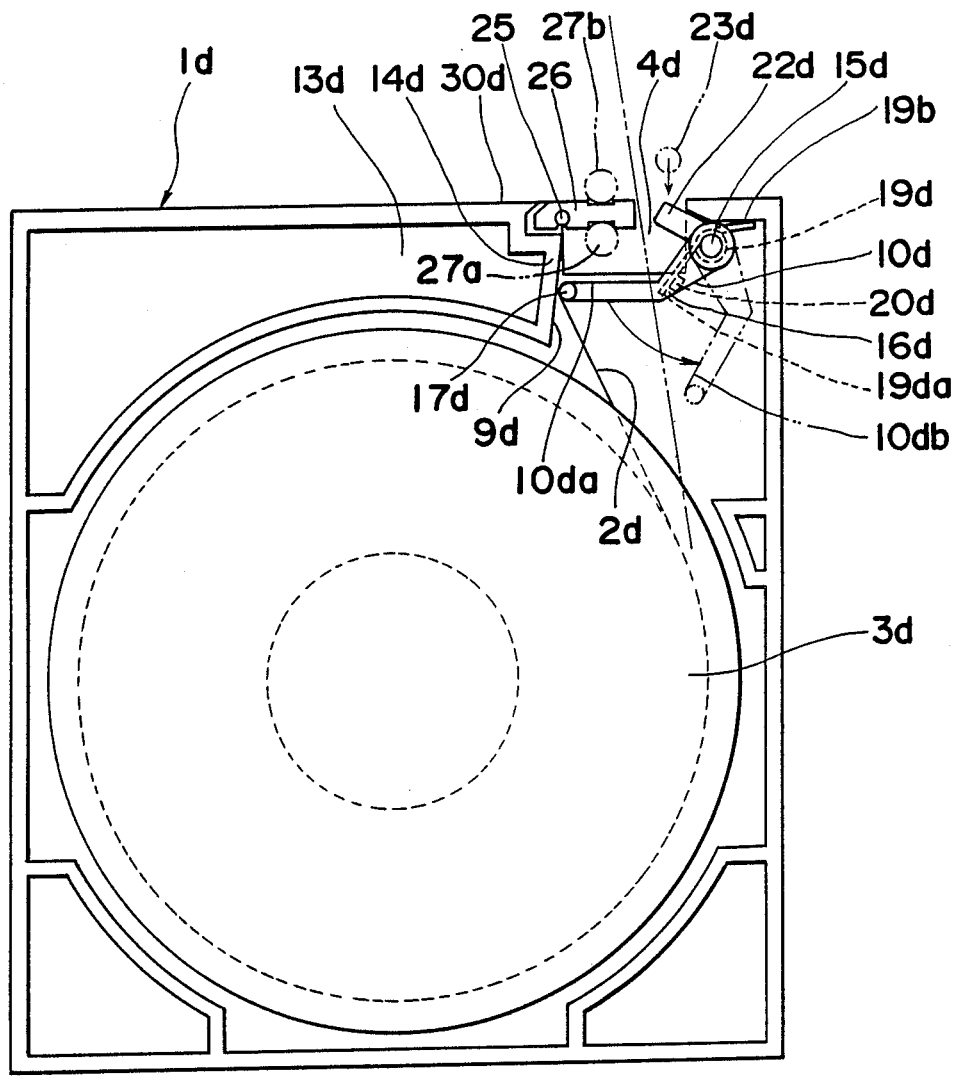

TAPE CARTRIDGE

BACKGROUND OF THE INVENTION

1. Field of the Invention

The present invention relates to a tape cartridge, and more particularly, to a tape cartridge for preventing a tape from protruding from a front surface thereof.

2. Description of the Prior Art

FIG. 1 shows a conventional tape cartridge. In FIG. 1, the tape cartridge comprises tape reels 3a and 3b rotatably enclosed at the left and the right sides of the inside of a case 1 thereof, wherein the tape reels 3a and 3b wind a magnetic recording tape 2. On the front portion of the case 1 facing a magnetic head of a recording and playing back device (not shown) during recording and playing back, pocket portions 4a and 4b, into which the magnetic head and the spindle of the recording and playing back device are respectively inserted, are formed, and a guiding member 5a is arranged at the left side of the pocket portion 4a, on the other hand, a guiding member 5b is arranged at the right hand of the pocket portion 4b. The tape 2 is taken from one of the reels, for example 3a, through the guiding member 5a, and drawn toward the front portion of the pocket portions 4a and 4b, in turn, the tape 2 is taken up by the reel 3b through the guiding member 5b in order to record or playing back a signal into or from the tape 2.

When the tape cartridge is not used and is not mounted in the recording and playing back device, a reel stopper member 6 can prevent the reels 3a and 3b from rotating so as to keep the tape 2 stretched straight between the guiding members 5a and 5b as shown in FIG. 1. However, the tape 2 tends to be slacked and easily protruded from the front surface 30 of the case 1, because of the play of the reels 3a and 3b in the circumferential direction thereof, and because the wound tape 2 onto the reels 3a and 3b is loosened from the roll of the tape 2. The tape 2 may not be loaded properly when the tape 2 is loosened and protrudes from the front surface 30 of the case 1. In order to prevent the tape 2 from protruding from the surface 30, a pin 7 for positioning the tape running path is arranged vertically on the tape running path between the tape guiding member 5b and the reel 3b, and an elastic tape pushing member 8 made of polyester resin is arranged facing the pin 7, then the tape 2 is slidably pinched between the pin 7 and the tape pushing member 8. This prevention means has an advantage that the prevention means can certainly prevent the tape 2 from protruding occurred by the tape loosening between the reels 3a and 3b, as compared with the other methods, such as a method which prevents the tape 2 from protruding by applying a tension on the tape 2.

However, in the conventional tape cartridge comprising the aforementioned prevention means which prevents the tape 2 from protruding by pinching the tape 2, the tape 2 is always pinched between the pin 7 and the tape pushing member 8, even when the tape 2 runs, thereby the load into the tape 2 increases and the tape 2 is easily damaged when the tape 2 runs. In particular, in the future, if the tape becomes thinner, the aforementioned problems of the running load of the tape 2 and the damage to the tape 2 may result in greater problems.

SUMMARY OF THE INVENTION

An essential object of the present invention is to provide a tape cartridge which can certainly prevent a tape from protruding from the front surface of the case thereof when the tape cartridge is not used, and which can reduce the running load of the tape and prevent the tape from being damaged.

According to the present invention, there is provided a tape cartridge comprising a tape running on a tape running path in the tape cartridge, a tape receiving member formed near the tape running path for slidably receiving the tape, and a tape pushing member arranged to face the tape receiving member through the tape, said tape pushing member being arranged to move between a tape pinching position such that the tape is pinched between the tape receiving member and the tape pushing member and a cancellation position such that the tape pushing member moves away from the tape.

Accordingly, when the tape cartridge is not used and is not mounted in a recording and playing back device, the tape pushing member is positioned at the tape pinching position, then the tape pushing member pushes the tape on the tape receiving member, resulting in that the tape cartridge can prevent the tape from protruding from the front surface of the tape cartridge. On the other hand, when the tape cartridge is mounted in a record and play back device and is used, the tape pushing member is positioned at the cancellation position, then the tape pushing member leaves the tape, resulting in that the tape can run stably on the tape incurring an extra path without running load and being damaged.

BRIEF DESCRIPTION OF THE DRAWINGS

FIG. 5 is a plane view of a tape cartridge of a third preferred embodiment according to the present invention.

DETAILED DESCRIPTION OF THE PREFERRED EMBODIMENTS

First Embodiment

Figure 1A:
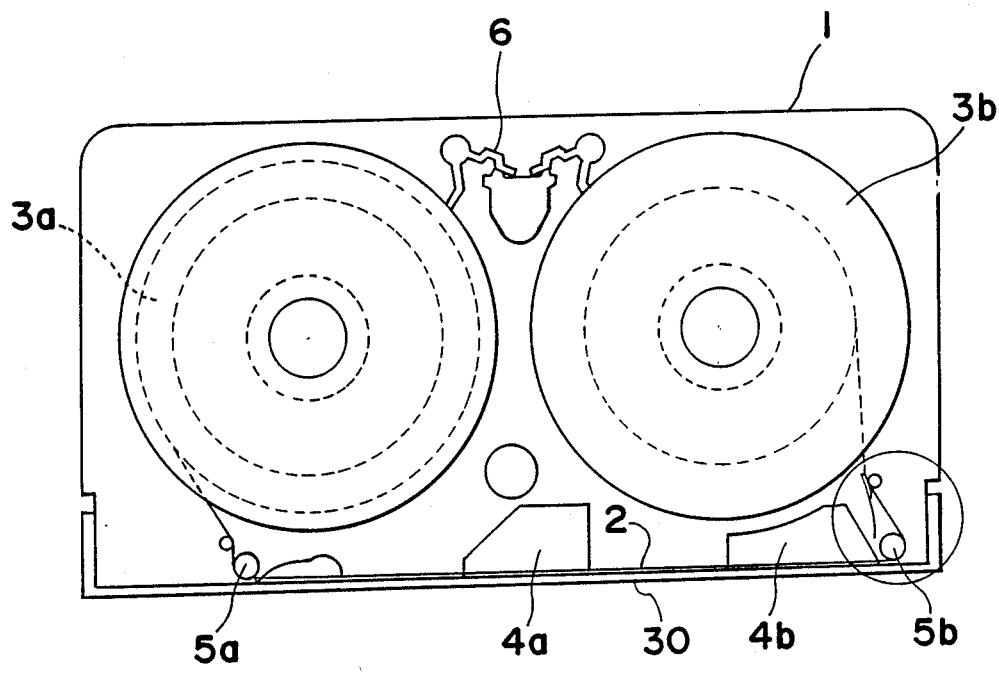
FIG. 1 is a plane view of a conventional tape cartridge.
Figure 1B:
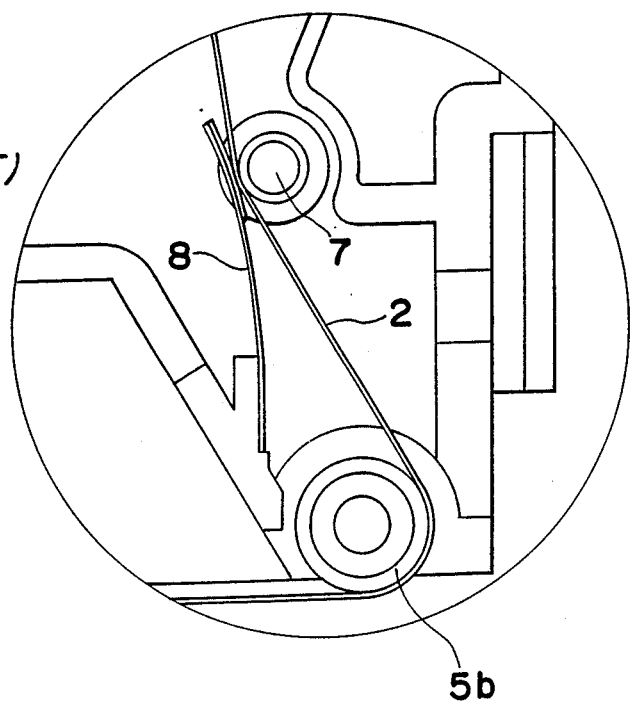

The different points of a tape cartridge of a first embodiment according to the present invention from the conventional tape cartridge shown in FIG. 1 will be described below, because the tape cartridge of the first preferred embodiment has almost the same construction as the conventional tape cartridge.

Figure 2:
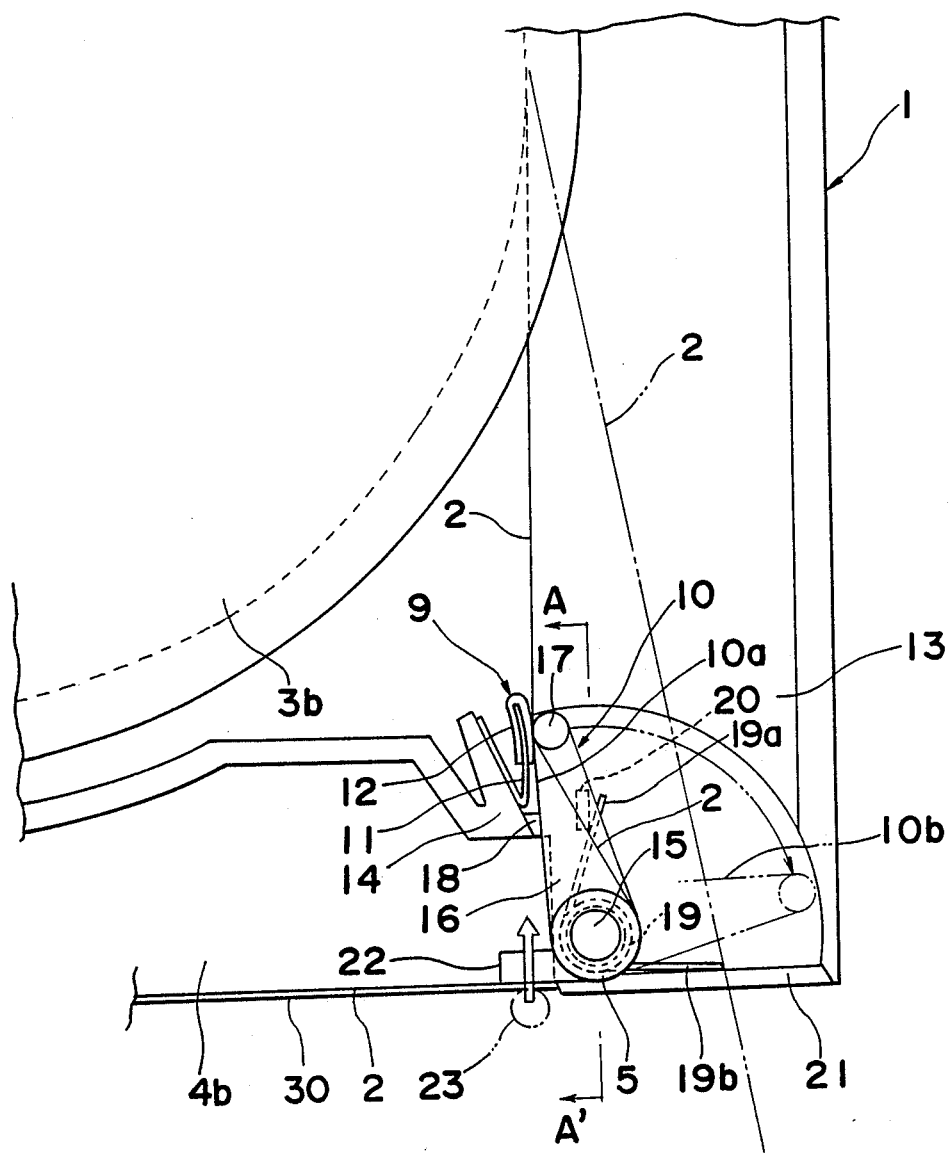
FIG. 2 is a plane view of a main portion of a tape cartridge of a first preferred embodiment according to the present invention.
Figure 3:
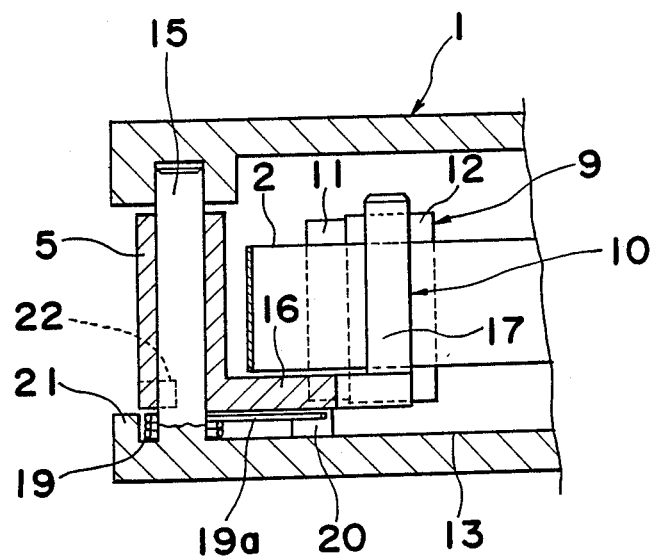
FIG. 3 is a longitudinal cross sectional view of the tape cartridge on the line of A–A' of FIG. 2.

FIGS. 2 and 3 shows the tape cartridge of the first embodiment. In FIG. 2, a tape receiving member 9 and a tape pushing member 10 are arranged near the tape running path between a reel 3b and a tape guiding member 5 arranged nearer to the front surface 30 of case 1 than the reel 3b.

The tape receiving member 9 comprises an elastic member 11 made by bending a polyester sheet generally in a V character shape having its free end portion covered by a lubricant sheet 12. The elastic member 11 is fixed in such a manner that one leg of the V character shaped elastic member 11 is fixed on a rib 14 vertically formed on a bottom surface 13 of the case 1 at around the middle position between the reel 3b and the tape guiding member 5.

The tape pushing member 10 and the tape guiding member 5 made of plastic resin material are formed as one body, wherein the tape guiding member 5 is formed in a cylindrical shape having a greater height than the diameter thereof and the tape guiding member 5 is rotatably inserted into a supporting shaft 15 which is arranged projecting from the bottom surface 13 of the case 1, and the tape guiding member 5 is rotatably supported by the supporting shaft 15. The tape pushing member 10 comprises an arm portion 16 formed extending from the bottom end portion of the tape guiding member 5 at right angle, and a cylindrical tape pushing pin 17 vertically formed on the top surface of another end portion of the extending arm portion 16.

The tape pushing member 10 is rotatable around the supporting shaft 15 between a tape pinching position 10a shown in a real line in FIG. 2, where the tape pushing pin 17 pushes the tape 2 so that the tape 2 is pinched between the tape pushing pin 17 and the tape receiving member 9, and a cancellation position 10b shown in a chain line in FIG. 2, where the tape pushing member 10 moves away from tape 2. The tape pushing member 10 is positioned at the tape pinching position 10a when the arm portion 16 of the tape pushing member 10 contacts with the positioning rib 18 arranged at the rib 14.

A coil spring 19 is fitted around the supporting shaft 15 between the bottom surface of the tape guiding member 5 and the bottom surface 13, wherein an arm portion 19a of the end portion of the coil spring 19 engages with a spring receiving portion 20 formed as one body on the bottom surface of the arm portion 16, and another arm portion 19b of the coil spring 19 engages with a projecting wall 21 formed at the front end of the bottom surface 13 of the case 1, so that the tape pushing member 10 is always resiliently biased toward the tape pinching position 10a by the coil spring 19.

A cancellation member 22 is formed as one body with the arm portion 16 extending to the left side of the case 1 in the horizontal direction from the supporting end portion of the arm portion 16, wherein the cancellation member 22 is arranged at an angle so as to face the inside of the pocket portion 46 when the tape pushing member 10 is positioned at the tape pinching position 10a, moreover, the tape pushing member 10 can be rotated around the supporting shaft 15 from the tape pinching position 10a to the cancellation position 10b when a cancellation operating member 23 arranged in the record and play back device enters the pocket portion 46 through the front surface 30 of the case 1 and pushes the cancellation member 22 in a direction into the outside of the case 1 as shown by an arrow mark.

When the tape cartridge is mounted in the record and play back device, the cancellation operating member 23 pushes the cancellation member 22 and the tape pushing member 10 rotates from the tape pinching position 10a into the cancellation position 10b around the supporting shaft 15, resulting in that the tape pushing pin 17 moves away from running path of the tape 2 completely. The cancellation position in which the pinching condition of the tape pushing member 10 is canceled can be maintained, when the cancellation operating member 23 continues to push the cancellation member 22.

When the tape cartridge is taken off from the record and play back device, the cancellation operating member 23 does not push the cancellation member 22, the tape pushing member 10 rotates into the tape pinching position 10a by the force of the coil spring 19, and the tape 2 is pinched between the tape receiving portion 9 and the tape pushing member 10, resulting in that the tape 2 can be prevented from protruding from the front surface 30 of the case 1 into the outside of the case 1.

In the aforementioned first preferred embodiment, the tape pushing member 10 is formed as one body with the tape guiding member 5, and the the supporting shaft 15 for the tape guiding member 5 is used as the supporting shaft of the tape pushing member 10, resulting in that the number of the fabricating process of the members 5 and 10 can be reduced. In particular, the tape pushing member 10 can be enclosed within a small area, and the tape cartridge can be made small.

Second Preferred Embodiment

Figure 4:
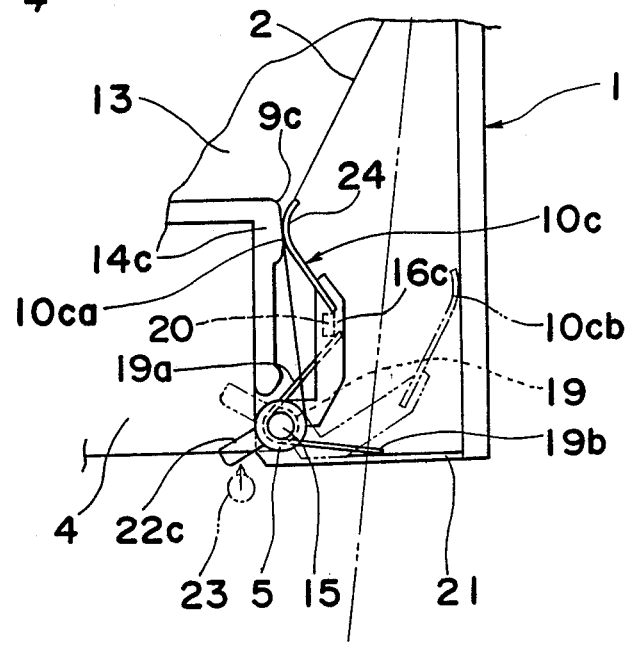
FIG. 4 is a plane view of a main portion of a tape cartridge of a second preferred embodiment according to the present invention.

FIG. 4 shows a tape cartridge of a second preferred embodiment according to the present invention. In FIG. 4, the same numeral as the numeral in FIGS. 2 and 3 designates the same member as the member in FIGS. 2 and 3, respectively, and the different points from the construction of the tape cartridge of the first preferred embodiment will be described below in details.

A rib 14c arranged inside of the tape guiding member 5 in the case 1 and formed projecting from the bottom surface 13 of the case 1 is used as a tape receiving member 9c corresponding to the tape receiving member 9 shown in FIGS. 2 and 3, wherein the rib 14c corresponds to the rib 14 shown in FIGS. 2 and 3. A tape pushing member 10c corresponding to the tape pushing member 10 shown in FIG. 2 comprises an arm portion 16c formed as one body with the tape guiding member 5, and a tape pushing member 24 made of a lubricant and elastic sheet which is mounted at the end portion of the arm portion 16c. The tape pushing member 10c operates as well as the tape pushing member 10c shown in FIG. 2. That is, the tape pushing member 10c is always resiliently biased by the coil spring 19 in a direction to a tape pinching position 10ca, and the tape pushing member 10 rotates around the supporting shaft 15 into a cancellation position 10cb when the cancellation operating member 23 of the recording and plying back device pushes a cancellation member 22c arranged at another end portion of the arm portion 16c.

Accordingly, the tape cartridge of the second preferred embodiment has the same advantages as the advantages of the tape cartridge of the first preferred embodiment.

Third Preferred Embodiment

FIG. 5 shows a one reel type tape cartridge of a third preferred embodiment according to the present invention. In FIG. 5, the tape cartridge comprises only one reel 3d rotatably enclosed inside of the case 1d thereof, and a pocket portion 4d for loading corresponding to pocket portion 4b shown in FIGS. 2 and 4, which is formed at a front surface 30d of the case 1d, wherein a tape end clamp 26 connected to an end portion of the tape 2d by a connecting member 25 is arranged inside of the pocket portion 4d near the front surface 30d of the case 1. A rib 14d, which is formed at one side of the pocket portion 4d projecting from the bottom surface 13d of the case 1d, is used as a tape receiving portion 9d corresponding to the tape receiving portion 9 shown in FIG. 2.

A tape pushing member 10d has the same construction as the construction of the tape pushing member 10 shown in FIGS. 2 and 3, wherein the tape pushing member 10d comprises a tape pushing pin 17d and a cancellation member 22d as well as the tape pushing member 10 shown in FIG. 2. The tape pushing member 10d is rotatably supported around the supporting shaft 15d so as to rotate between a tape pinching position 10da and a cancellation position 10db.

When the tape cartridge is not used and is not mounted in a record and play back device, the tape pushing member 10d is resiliently biased by a coil spring 19d in a direction to the tape pinching position 10da, and the tape 2d is pinched between the tape pushing member 10d and the tape receiving portion 9d, resulting in that the tape pushing member can prevent the tape 2d from protruding from the front surface 30d of the case 1d of the tape cartridge into the outside of the case 1d.

On the other hand, when the tape cartridge is mounted in a recording and playing back device, before tape loading pins 27a and 27b arranged in the record and playing back device pull out the tape end clump 26, a cancellation operating member 23d arranged in the recording and playing back device pushes a cancellation member 22d arranged in the tape pushing member 10d, thereby the tape pushing member 10d rotates with center of a supporting shaft 15d into the cancellation position 10db, resulting in that the tape pushing pin 17d leaves away from the tape 2d, completely.

Other Preferred Embodiments

In the aforementioned preferred embodiments, the cancellation operating members 23 and 23d make the tape pushing members 10, 10c and 10d rotate by directly pushing the cancellation members 22, 22c and 22d, respectively. However, the cancellation operating members 23 and 23d may push the tape pushing members 10, 10c and 10d, through an intermediate member arranged in the case 1, respectively.

What is claimed is:
1. A tape cartridge comprising:
   a tape cartridge case containing first and second reels;
   a tape directed along a predetermined tape run path between said first and second reels in said tape cartridge case;
   a tape receiving member disposed in said tape cartridge case near said tape run path for receiving said tape; and
   a tape pushing member disposed in said tape cartridge case and positioned to oppose said tape receiving member so that said tape is directed between said tape pushing member and said tape receiving member;
   wherein said tape pushing member moves between (1) a tape pinching position whereby said tape is pinched between said tape receiving member and said tape pushing member when said tape is not running, and (2) a cancellation position whereby said tape pushing member is moved away from said tape receiving member and said tape when said tape is running.

2. The tape cartridge as defined in claim 1, wherein said tape pushing member comprises a tape pushing arm member for pinching said tape and a tape guiding member for guiding said tape on said tape run path.

3. The tape cartridge as defined in claim 2, wherein said tape receiving member comprises an elastic member and a lubricant sheet formed thereon for contacting said tape.

4. The tape cartridge as defined in claim 3, wherein said tape pushing member includes a cancellation member formed on said tape pushing arm member for pushing said tape pushing member into said cancellation position.

5. The tape cartridge as defined in claim 4, wherein said tape cartridge case contains a coil spring with first and second coil spring arms operatively associated with said tape pushing member, said coil spring biasing said tape pushing member in said tape pinching position, wherein said tape pushing member includes a spring receiving portion for engaging said tape pushing member with said first coil spring arm, and wherein said second coil spring arm engages a projecting wall portion of said tape cartridge case.

6. The tape cartridge as defined in claim 5, wherein said tape pushing arm member comprises a cylindrical tape pushing pin portion for pinching said tape and an intermediate arm portion for connecting said tape pushing pin portion to said tape guiding member, and wherein said tape receiving member is an elastic V-shaped member disposed on a base rib member formed within said tape cartridge case.

7. The tape cartridge as defined in claim 6, wherein said tape cartridge case contains a positioning rib member formed adjacent to said base rib member and opposite to said tape pushing member for engaging said intermediate arm portion when said tape pushing member is in said tape pinching position, wherein said tape guiding member is supported on a rotatable support shaft, and wherein said cancellation member is operated by being pushed by a cancellation operating member contained in a tape playing device outside of said tape cartridge case so as to push said tape pushing arm into said cancellation position.

8. The tape cartridge as defined in claim 2, wherein said tape pushing arm member comprises an end portion for pinching said tape, and an intermediate arm portion for connecting said end portion to said tape guiding member, said end portion being covered with a lubricant sheet.

9. The tape cartridge as defined in claim 8, wherein a cancellation member is formed on said tape pushing member for pushing said tape pushing member into said cancellation position.

10. The tape cartridge as defined in claim 9, wherein said tape receiving member comprises a rib-shaped member, wherein said tape cartridge case contains a coil spring with first and second coil spring arms operatively associated with said tape pushing member, said coil spring biasing said tape pushing member in said tape pinching position, wherein said intermediate arm portion of said tape pushing member includes a spring receiving portion for engaging said tape pushing member with said first coil spring arm, and wherein said second coil spring arm engages a projecting wall portion of said tape cartridge case.

11. The tape cartridge as defined in claim 10, wherein said tape guiding member is supported on a rotatable shaft and wherein said cancellation member is operated by being pushed by a cancellation operating member contained in a tape-playing device outside of said tape cartridge case so as to push said tape pushing member into said cancellation position.

12. A tape comprising:

a tape cartridge case containing a reel;

a tape directed along a predetermined tape run path into said tape cartridge case and around said reel in said tape cartridge case;

a tape receiving member disposed in said tape cartridge case near said tape run path for receiving said tape;

a tape pushing member disposed in said tape cartridge case and positioned to oppose said tape receiving member so that said tape is directed between said tape pushing member and said tape receiving member;

wherein said tape pushing member moves between (1) a tape pinching position whereby said tape is pinched between said tape receiving member and said tape pushing member when said tape is not running, and (2) a cancellation position whereby said tape pushing member is moved away from said tape receiving member and said tape when said tape is running.

13. The tape cartridge as defined in claim 12, wherein said tape pushing member comprises a cylindrical tape pushing pin for pinching said tape and a tape pushing arm portion supported on a rotatable support shaft.

14. The tape cartridge as defined in claim 13, wherein said tape cartridge case contains a coil spring with first and second coil spring arms, said coil spring biasing said tape pushing arm in said tape pinching position, wherein said tape pushing arm portion includes a spring receiving portion for engaging said tape pushing member with said first coil spring arm, and wherein said second coil spring engages a wall portion of said tape cartridge case.

15. The tape cartridge as defined in claim 14, wherein said tape pushing member includes a cancellation member for pushing said tape pushing member into said cancellation position and wherein said tape receiving member is a rib-shaped member.

16. The tape cartridge as defined in claim 15, wherein said cancellation member is operated by being pushed by a cancellation operating member contained in a tape playing device outside of said tape cartridge case so as to push said tape pushing member into said cancellation position.

17. A tape comprising:

a tape cartridge case;

a tape directed along a predetermined tape run path in said tape cartridge case;

a tape receiving member disposed in said tape cartridge case near said tape run path for receiving said tape; and a tape pushing member disposed in said tape cartridge case and positioned to oppose said tape receiving member so that said tape is directed between said tape pushing member and said tape receiving member, said tape pushing member comprising a tape pushing arm member rotatably mounted on a shaft;

wherein said tape pushing arm member moves between (1) a tape pinching position whereby said tape is pinched between said tape receiving member and said tape pushing member when said tape is not running, and (2) a cancellation position whereby said tape pushing member is moved away from said tape receiving member and said tape, and wherein said tape pushing arm member is biased toward said tape pinching position by a resilient biasing member disposed in said tape cartridge case and said tape pushing arm is moved into said cancellation position when said tape cartridge is loaded into a recording and play back device.

* * * * *